No. 670,972. Patented Apr. 2, 1901.
M. M. SMITH.
SELF PROPELLED VEHICLE.
(Application filed Oct. 30, 1900.)
(No Model.) 5 Sheets—Sheet 2.
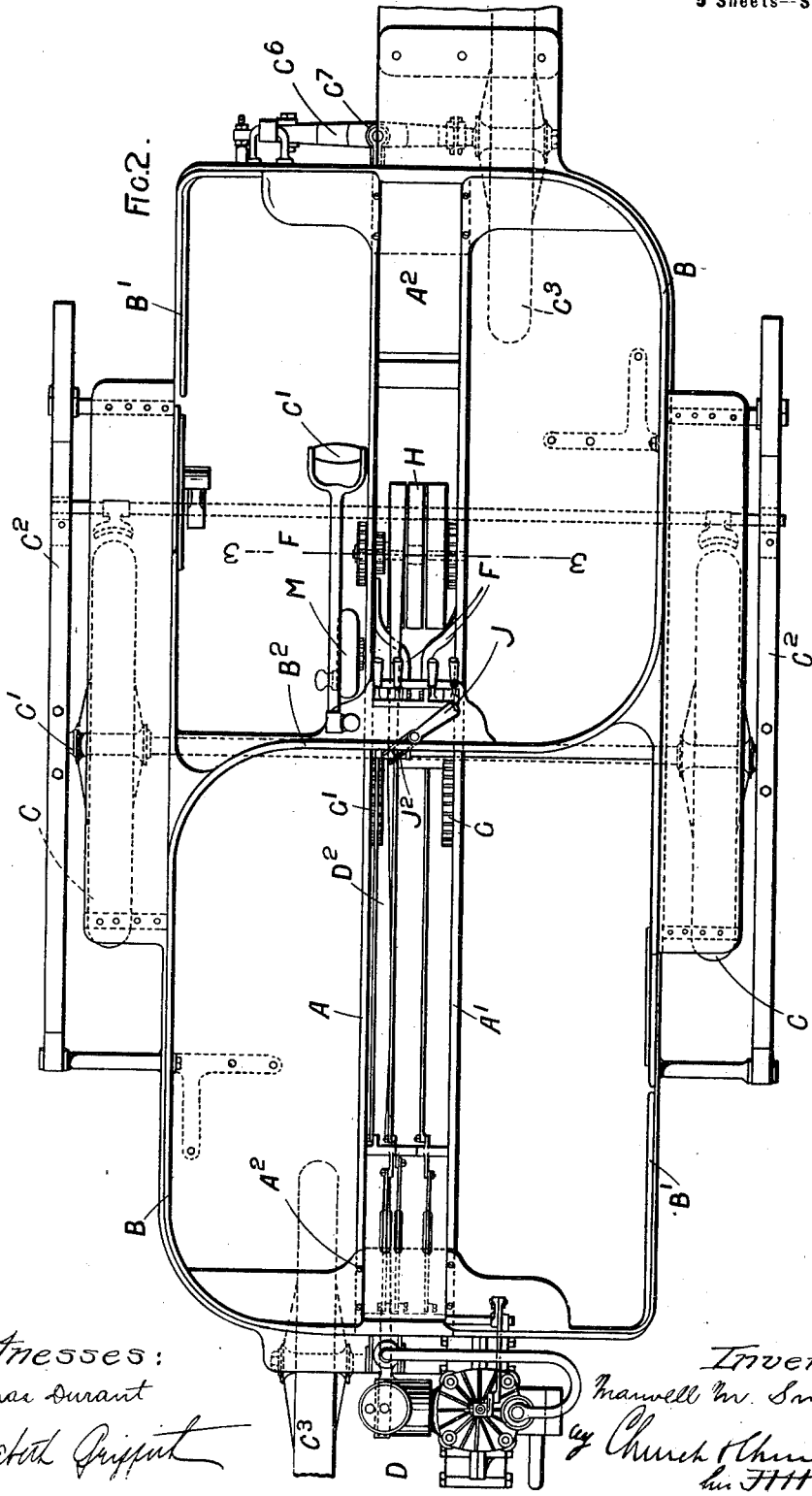
Witnesses:
Thomas Durant
Elizabeth Griffith
Inventor:
Maxwell M. Smith
by Church & Church
his Attys.

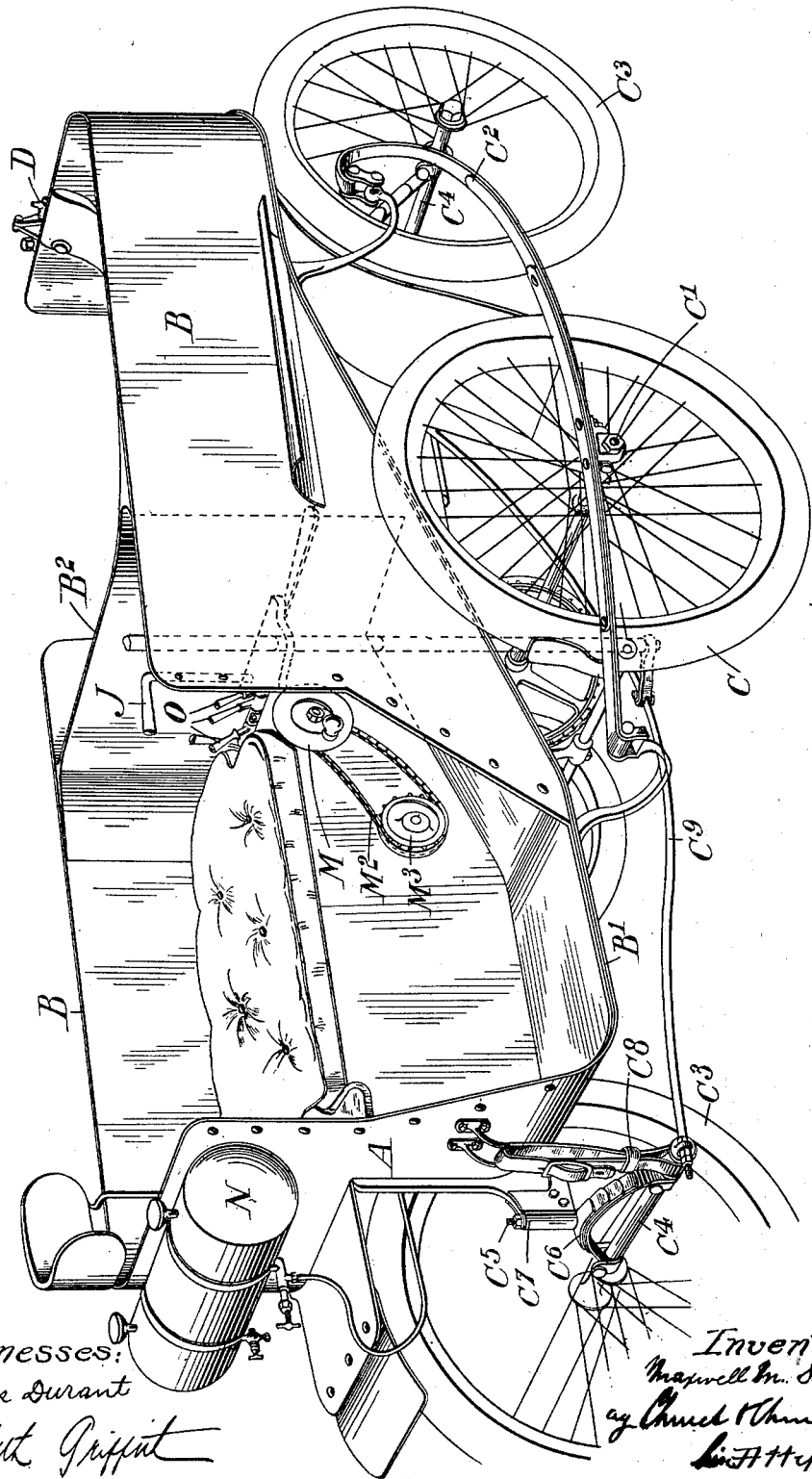

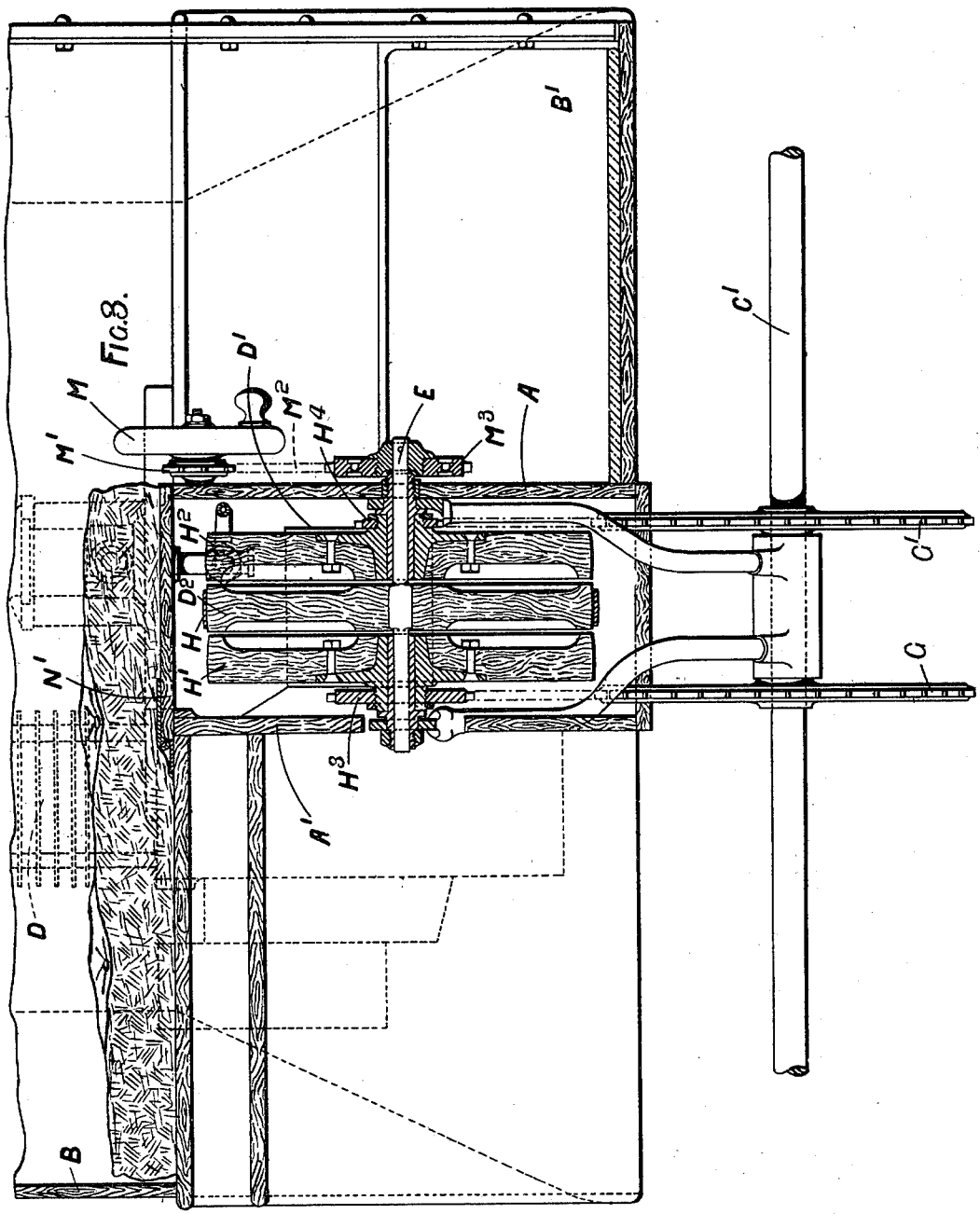

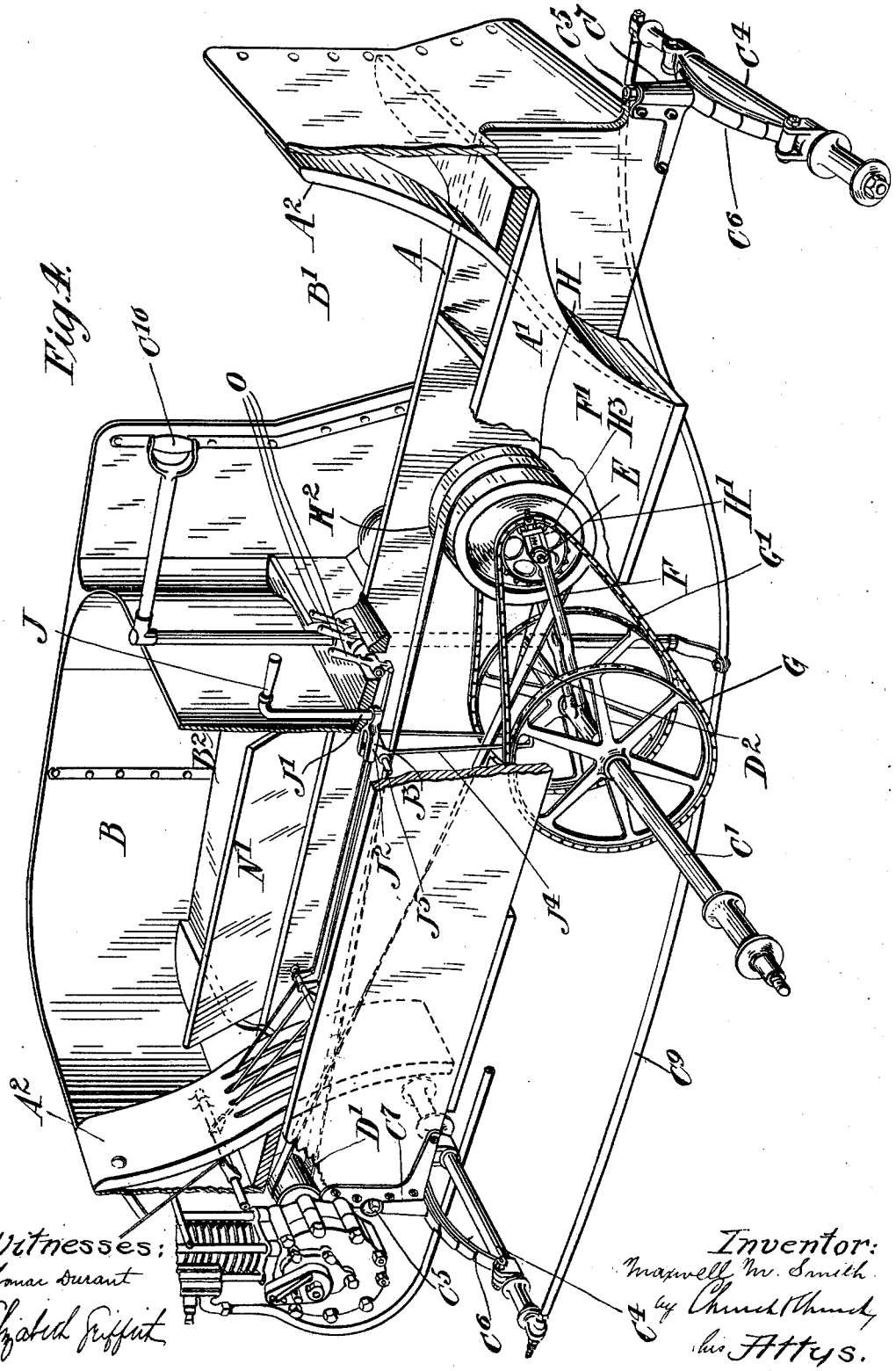

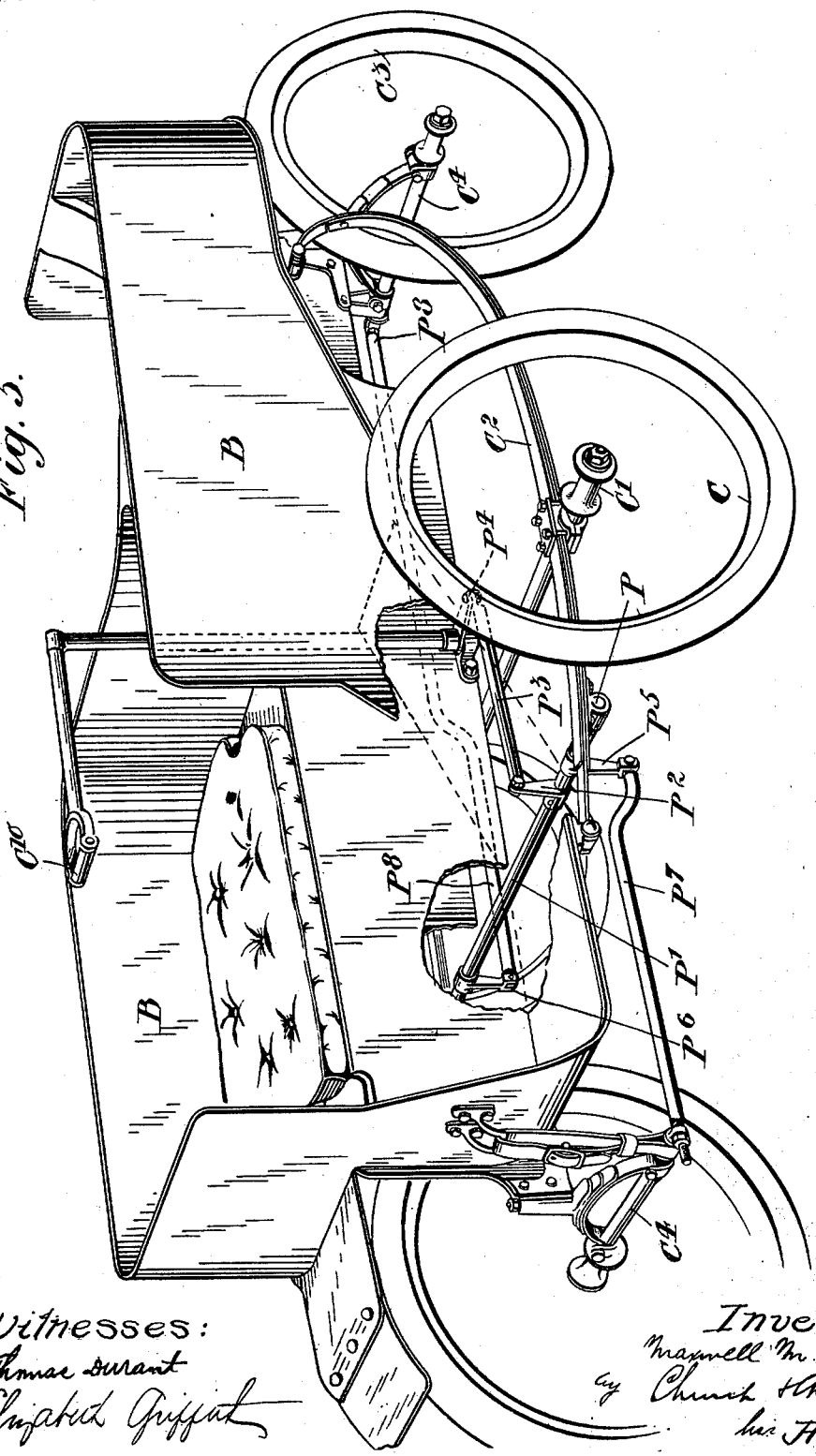

UNITED STATES PATENT OFFICE.

MAXWELL MABERLY SMITH, OF LONDON, ENGLAND.

SELF-PROPELLED VEHICLE.

SPECIFICATION forming part of Letters Patent No. 670,972, dated April 2, 1901.

Application filed October 30, 1900. Serial No. 34,941. (No model.)

*To all whom it may concern:*

Be it known that I, MAXWELL MABERLY SMITH, a subject of the Queen of England, residing at London, England, have invented certain new and useful Improvements in or Relating to Self-Propelled Vehicles, (for which application has been made in Great Britain under No. 6,363, dated April 5, 1900,) of which the following is a specification.

This invention relates to self-propelled vehicles, and has particular reference to the general design of the vehicle and to one or two parts of the mechanism, including the driving-gear.

The vehicle is built upon a central trunk or girder, and the seats are arranged above this girder in such a manner that the passengers sit on opposite sides of the girder, but facing the central line of the vehicle, and consequently toward each other. A portion of each of the side walls of the vehicle is broken away in the front of each seat to give access to the seat.

The vehicle is provided with two driving-wheels arranged one on each side of the vehicle approximately midway of its length, and a steering-wheel is arranged fore and aft of the vehicle, mechanism being provided by which the two wheels are steered together. Each steering-wheel is mounted upon one extremity of a road-wheel axle, the road-wheel axle being provided approximately midway of its length with a pivot-pin, by means of which it is secured to the vehicle. A spring is preferably interposed between the axle and the vehicle. That end of the axle remote from that upon which the wheel is mounted is connected to the body of the vehicle by a supporting-link.

The driving mechanism is arranged within the central trunk or girder, which comprises two longitudinal members placed at a convenient distance apart and braced together by suitable end pieces, so that a hollow trunk or box is formed, within which the driving mechanism is arranged.

This invention has, further, reference to a device for varying the moment of ignition when the driving-belt is shifted from the driving-pulley to a loose pulley, or vice versa, and a device is also provided by which the moment of ignition may be varied independently of the operation of the belt.

In the accompanying drawings, which illustrate one method of carrying out this invention, Figure 1 is a perspective view of the complete vehicle. Fig. 2 is a plan of the same with the seats removed. Fig. 3 is a transverse section on the line 3 3 of Fig. 2. Fig. 4 is a perspective view of the vehicle with part of the body broken away to expose the driving mechanism, and Fig. 5 is a perspective view showing the application to the car of a modified form of steering mechanism.

Like letters indicate like parts throughout the drawings.

Referring to Figs. 1 and 2, the vehicle is built upon a central trunk or girder comprising two longitudinal members A and A', placed parallel to each other at a convenient distance apart and secured together by end pieces $A^2$. Upon this central trunk are mounted the seats of the vehicle, (in this case two in number,) the front edge of the one seat being placed level with the member A, while the front edge of the other seat is placed level with the member A'. The main portion of each seat thus rests on opposite sides of the central trunk or girder. The walls B of the vehicle-body are supported by any convenient means from the central trunk and the sides walls are broken away at B' to give access to the seats. The seats are separated by a transverse central wall $B^2$, which serves to strengthen the side walls.

The vehicle is provided with two driving-wheels C, arranged one each side of the vehicle-body at a point about midway of its length. The wheels C are connected together by a driving-axle C', suspended from the vehicle-body by springs $C^2$, which may be placed either outside the wheels, as shown, or between the wheels and the body. At each end of the vehicle is a steering-wheel $C^3$, carried at one extremity of an axle $C^4$. The axle $C^4$ is in each case secured to the vehicle by a vertical pin $C^5$, arranged approximately midway of the length of the axle, a bow-spring $C^6$ being interposed between the pin and the axle. The pin $C^5$ is carried in a socket $C^7$, secured to one end of one of the longitudinal members A A', forming the central trunk or girder, and is free to pivot within this socket. The members A A', although of the same length, are arranged the one slightly in advance of the other, so that the end of the member A projects beyond the vehicle-body at one end of the vehicle, while the member A' projects in a similar manner at the other end of the vehicle, and to these projecting ends the sockets $C^7$ are secured. To support that end of the axle $C^4$ remote from the wheel $C^3$, a strap $C^8$ is provided, by which it is secured to the vehicle-body, and thus prevented from being depressed by the weight of the vehicle. In order that both steering-wheels may be operated simultaneously, they are connected by a rod $C^9$, which is operatively connected to a steering-handle $C^{10}$.

The motor D, which may be conveniently mounted at one end of the vehicle, drives, by means of its pulley D' and belt $D^2$, a counter-shaft E. The counter-shaft E is mounted in the upper ends of a bifurcated bracket F, Figs. 3 and 4, the lower end of which is supported by the road-wheel axle C'. The axle C' is free to revolve with the lower end of the bracket F and carries two chain-wheels G G', respectively. Fast upon the counter-shaft E and in a central position upon the same is mounted a pulley H, and on each side of the pulley H and free upon the shaft E are mounted pulleys H' $H^2$. The pulley H' carries fast upon it a sprocket-wheel $H^3$, geared by means of a chain to the chain-wheel G upon the driving-shaft C', and the pulley $H^2$ has similarly mounted upon it a sprocket $H^4$, geared by a chain to the chain-wheel G' on the driving-shaft C'. The pulley D' on the motor-shaft is relatively broad, so that the belt $D^2$ may be shifted onto either of the pulleys H H' $H^2$ without becoming disengaged from the pulley D'. In order that the belt or chains may be conveniently tightened, the upper ends of the bifurcated bracket F are provided with adjustable devices F', similar to the chain adjustment for a bicycle, so that the counter-shaft E may be moved nearer to or farther from the driving-shaft C'.

Owing to the angle at which the bracket F is placed relatively to the driving-belt $D^2$ and chains connecting the sprockets $H^3$ $H^4$ with the chain-wheels G', there is very little tendency for the free end of the bracket to rise or fall, but should there be any tendency to move in either direction it is immediately checked by the longitudinal members A A', through the sides of which the ends of the counter-shaft E project.

To shift the belt $D^2$ from one pulley to the other, a handle J is provided, which is pivoted at J', Fig. 4, to any convenient part of the vehicle and carries a bifurcated lever $J^2$, which engages a pin $J^3$, secured to a belt-shifter $J^4$. The belt-shifter $J^4$ slides upon a guide $J^5$, transversely arranged between the members A A' of the central trunk or girder, so that when the handle J is turned in one direction the belt-shifter $J^4$ will move the belt $D^2$ onto one of the outside pulleys, while when moved in the opposite direction the belt will be moved onto the other outside pulley, and when in a central position will rest on the central pulley.

To start the motor, a hand-wheel M is mounted upon the side of the longitudinal member A and is geared, by means of a sprocket-wheel M' and chain $M^2$, to a sprocket-wheel $M^3$, which gears through the medium of any well-known form of clutch with the counter-shaft E. When it is desired to start the vehicle, a belt $D^2$ is placed upon the pulley H and the hand-wheel M revolved. Motion imparted by the hand-wheel M to the counter-shaft E is thus transmitted, by means of a pulley H and belt $D^2$, to the motor. When the motor has gained sufficient speed, it overruns the clutch of the starting mechanism in the well-known manner. It is then only necessary to operate the change-speed handle J with its fork $J^2$, so as to bring the belt $D^2$ upon either the pulley H' or $H^2$, and the vehicle will be immediately set in motion.

The carbureter N is conveniently arranged at the opposite end of the vehicle to that upon which the motor is mounted, and levers O are provided for controlling the admission of air or oil to the cylinder or for opening the compression-tap in the well-known manner.

By arranging the steering-wheels one upon the longitudinal member A and the other upon the longitudinal member A' and by mounting one wheel upon the right-hand end of its axle and the other upon the left hand-end of its axle the steering-wheels are made to run upon lines on opposite sides of the central line of the vehicle and which lie between the driving-wheels.

The arrangement of the central trunk or girder enables this form of vehicle to be readily fitted with apparatus for electric motive power in the place of oil, as the trunk will be capable of containing a considerable number of accumulators.

It will be understood that the motor may be placed in any convenient position upon the vehicle, such as underneath it or at one side of the central frame, though the driving mechanism is preferably mounted between two longitudinal members A A', as described.

The spaces between the members A A' may, if desired, be covered in beneath the seats with hinged or removable covers, such as indicated at N', Fig. 4.

The side supporting-springs $C^2$ of the car are shown in Fig. 5 as arranged within the driving-wheels C, and mounted upon these springs are blocks or bearings P, adapted to support the journaled ends of a shaft P'. The shaft P' is provided with an arm $P^2$, pivoted to a connecting-rod $P^3$, the free end of which is secured to an arm $P^4$, carried at the lower end of the vertical shaft to which the steering-handle $C^{10}$ is attached. The shaft P' is also provided with arms P⁵ P⁶, respectively arranged one at each end of the shaft. The arm P⁵ is connected by a rod P⁷ to the free end of the rear steering-axle C⁴, and the arm P⁶ is similarly connected by a rod P⁸ to the free end of the forward steering-axle of the vehicle. The operation of this steering mechanism is obvious. When the steering-handle C¹⁰ is moved either to the right or left, the free end of the arm P⁴, secured at the base of the vertical shaft carrying the steering-handle, will be moved through an arc, carrying with it the rod P³. The rod P³, acting through the medium of the arm P², will partially revolve the shaft P', thus moving the rods P⁷ P⁸ in a forward or rearward direction and so simultaneously operating the forward and rear steering-axles.

It should be noted that the steering-wheels being arranged on opposite sides of the central girder A A' permit the wheel-base of the vehicle to be shorter than would otherwise be the case, as each wheel can be placed beneath one of the seats of the vehicle, and by placing them thus beneath the seats a larger-sized wheel can be used than would be the case if they had to be mounted beneath the footboard of the vehicle.

It will be understood that although a hollow girder comprising the members A A' A² has been described a solid girder may be used, if preferred, the driving mechanism being conveniently mounted upon its sides.

It is obvious that in place of the straps C⁸, supporting one end of the steering-wheel axles, any other suitable device may be used for the same purpose, such as the quadrant commonly used in the old type of quadricycles.

Although the wheels C, mounted upon the driving-axle C', have been described above as "driving-wheels," it will be understood that if both of these wheels are driving-wheels differential gear may be employed between the driving gear-wheels G G' and the shaft C' in the well-known manner. Otherwise one wheel only is used to drive the vehicle, the other being either free upon the shaft C' or free upon a stationary shaft, over which a driving-shaft for one of the wheels may be mounted in the form of a sleeve.

What I claim as my invention, and desire to secure by Letters Patent, is—

1. In a self-propelled vehicle the combination of a central longitudinal girder, a vehicle-body built thereon, road-wheels upon a transverse driving-axle, driving-gear, a motor, a steering-wheel mounted at the forward end of the girder, a steering-wheel at the rear end of the girder and means for controlling these wheels simultaneously substantially as set forth.

2. In a self-propelled vehicle the combination of a central longitudinal girder, a vehicle-body built thereon, road-wheels upon a transverse driving-axle, a steering-wheel at the forward end of the girder, a steering-wheel at the rear end of the girder, each of the steering and driving wheels positioned so as to run in a separate track, driving-gear, a motor and mechanism for controlling the steering-wheels substantially as set forth.

3. In a self-propelled vehicle the combination of a central longitudinal girder, a vehicle-body built thereon, seats in this vehicle-body disposed on either side of the central girder, road-wheels, two of which are mounted upon a transverse driving-axle, springs interposed between the vehicle-body and the road-wheel axles, driving-gear and a motor substantially as set forth.

4. In a self-propelled vehicle the combination of a central longitudinal girder, a vehicle-body built thereon, road-wheels, two of which are mounted upon a transverse driving-axle, driving-gear, a bifurcated member connected to the driving-axle and to the driving-gear, and a motor substantially as set forth.

5. In a self-propelled vehicle the combination of longitudinal members and distance-pieces connecting these members, the whole forming a central longitudinal girder, a vehicle-body built upon this girder, a transverse driving-axle, road-wheels mounted thereon, driving-gear, a motor, a steering road-wheel mounted at the leading end of the girder, a steering road-wheel mounted at the rear end of the girder and means for simultaneously controlling these steering-wheels substantially as set forth.

6. In a self-propelled vehicle the combination of longitudinal members, distance-pieces connecting these members, the whole forming a central longitudinal girder, a vehicle-body built upon this girder, a transverse driving-axle, road-wheels mounted upon this axle, driving-gear, a motor, a socket mounted at the leading end of the central girder, a second socket mounted at the rear end of the girder, an axle pivoted to each socket at a point approximately midway of the length of the axle, a road-wheel mounted at one end of one such axle, a road-wheel mounted at one end of the other such axle, each road-wheel of the vehicle being arranged to run in a track separate from the other wheels substantially as set forth.

7. In a self-propelled vehicle the combination of longitudinal members, distance-pieces connecting these members the whole forming a central longitudinal girder, a vehicle-body built upon this girder, a transverse driving-axle, road-wheels mounted upon this axle, driving-gear, a motor, a socket mounted at the leading end of the central girder, a second socket mounted at the rear end of the girder, an axle pivoted to each socket at a point approximately midway of the length of the axle, a steering road-wheel mounted at one end of one such axle, a second steering road-wheel mounted at one end of the other such axle, each road-wheel of the vehicle being arranged to run in a track separate from the other wheels, a link connecting the free end of the axle of each steering road-wheel to the vehicle-body and means for simultaneously controlling these steering road-wheels, substantially as set forth.

In testimony whereof I have signed my name to this specification in the presence of two subscribing witnesses.

MAXWELL MABERLY SMITH.

Witnesses:
 ALFRED J. BOULT,
 HARRY B. BRIDGE.